United States Patent

[11] 3,564,192

[72] Inventors Charles C. Pease
Pennsauken;
Lawrence P. English, Haddon Heights, N.J.
[21] Appl. No. 725,324
[22] Filed Apr. 30, 1968
[45] Patented Feb. 16, 1971
[73] Assignee Omark Industries, Inc.
Portland, Oreg.
Continuation-in-part of application Ser. No. 279986, May 13, 1966, now abandoned.

[54] SOLID-STATE SWITCHING-CIRCUIT FOR CAPACITOR DISCHARGE STUD WELDING
5 Claims, 1 Drawing Fig.

[52] U.S. Cl. .................................................... 219/98
[51] Int. Cl. .................................................... B23k 9/20
[50] Field of Search ...................................... 219/98, 99

[56] References Cited
UNITED STATES PATENTS
3,171,011  2/1965  English .......................... 219/98
OTHER REFERENCES
H. R. Lowry, et al.; " General Electric Controlled Rectifier Manual"; First Edition; 3-20-60; Section 3.16 relied on

*Primary Examiner*—J. V. Truhe
*Assistant Examiner*—R. E. O'Neill
*Attorney*—Charles F. Duffield

ABSTRACT: Welding apparatus including a welding gun for holding a stud to be welded to a workpiece and a source of welding energy including a capacitor together with current control means for discharging the capacitor across the stud and workpiece to effect the weld where the current control means includes a gating rectifier between the capacitive power supply and the stud and workpiece and a bleed resistor across the capacitive power supply and a cathode of the gating rectifier and parallel to the stud and workpiece to control $dV/dt$ between the anode and cathode of the gating rectifier.

PATENTED FEB 16 1971
3,564,192
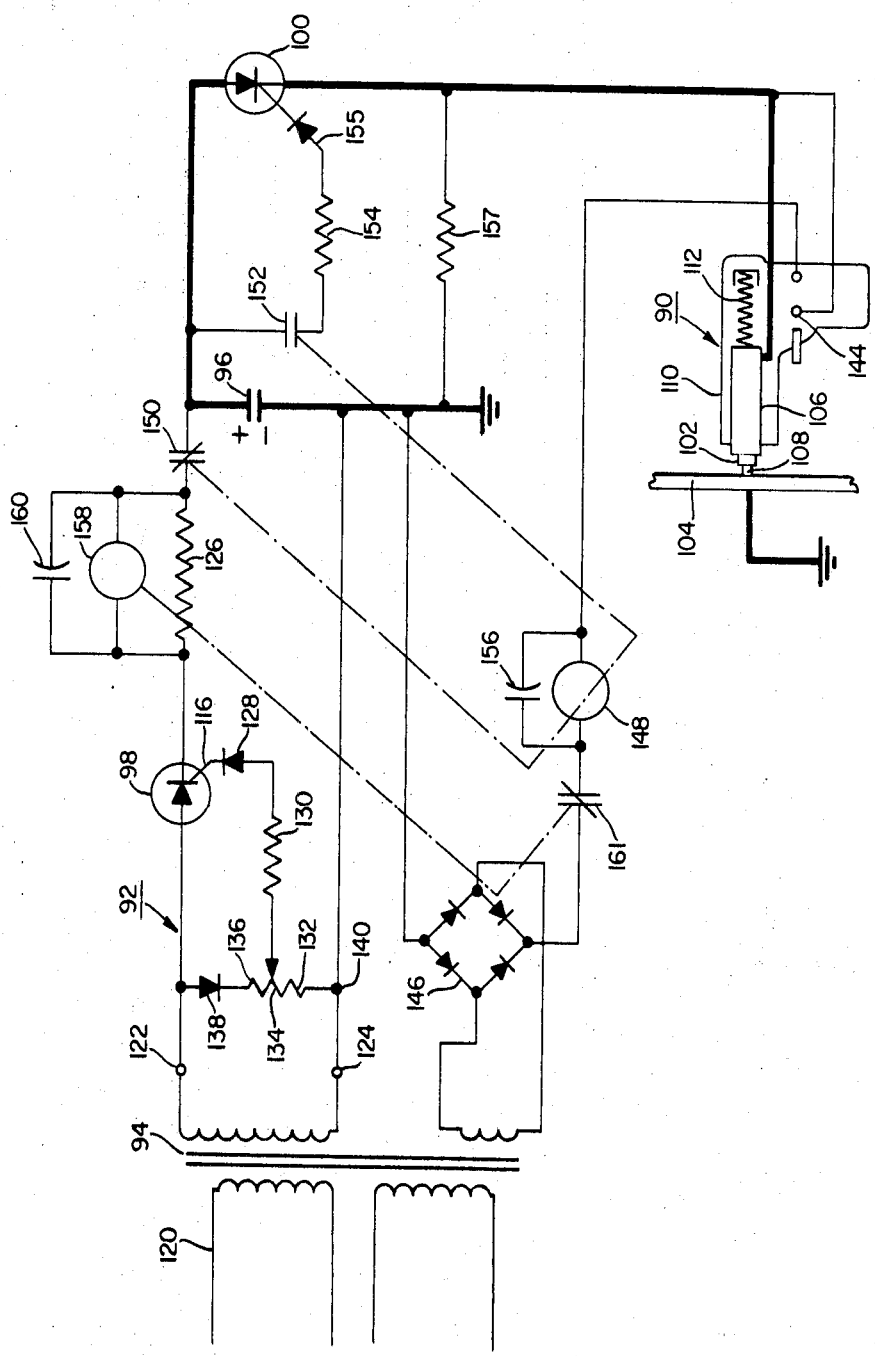
INVENTORS.
LAWRENCE P. ENGLISH
BY CHARLES C. PEASE
Charles F. Duffield
ATTORNEY.

SOLID-STATE SWITCHING-CIRCUIT FOR CAPACITOR DISCHARGE STUD WELDING

The present application is a continuation in part of application Ser. No. 279,986 filed May 13, 1963, now abandoned.

This relates to electric welding, and more particularly to stud welding devices for joining one end of an axially elongated stud to the surface of a laterally extended workpiece for any of a variety of purposes. For example, the outer end of the stud may be threaded to permit desired components to be fastened to the workpiece after the stud has been welded thereto.

A variety of electrical systems have been proposed for stud welding devices of the foregoing type. In one such system, the stud is biased toward the workpiece and power is supplied to the contiguous portions of the stud and workpiece from a suitable power source such as a capacitor. Here the stud may be provided with a projection which is biased into pressure contact with the workpiece in such a way that discharge of the power source through the stud projection and the workpiece results in disintegration of the projection, heating of the contiguous portions of the stud and the workpiece to welding temperature and diffusion bonding of the portions together under the applied pressure. Alternatively the stud may be released under bias toward the workpiece in such a way that when contact is made, the suitable power source discharges to produce the weld. In a third mode of stud welding, the stud, after being biased against the work, may be withdrawn from the workpiece to establish an arc and thereafter may be plunged into the workpiece to join the contiguous resulting molten portions. In any case, the welding currents are large so that components operate under rugged conditions. Consequently, these components have, in the past, been of heavy construction, often requiring considerable maintenance. The present invention contemplates, for use in a stud welding device of any of the foregoing types, a novel switching component characterized by absence of moving parts and unusually light construction, which minimizes maintenance requirements while maintaining effective operation.

More particularly, the present invention utilizes a gating rectifier in the place of the mechanical contactors heretofore used. The type of gating rectifier employed is the type preferably called a "silicon controlled rectifier." Gating rectifiers of this type are characterized by being nonconductive between the anode and cathode terminals until a potential is applied across the gate to cathode junction of sufficient magnitude to establish a current through the junction above the predetermined holding current of the rectifier. In the present invention, the silicon controlled rectifier is connected in series with the welding power supply and stud and workpiece by its anode and cathode terminals and provides the switching circuit to discharge the capacitive power supply upon an appropriate signal to the gate of the rectifier.

The gating of the rectifier is accomplished by applying the welding power supply potential across the gate to cathode junction of the rectifier by appropriate switching means operated by the control means of the welding system.

Additionally, the present invention employs a bleed resistor across the cathode of the rectifier and the negative terminal of the welding power supply to maintain a small leakage current from the anode to cathode of the silicon controlled rectifier in order that $dV/dt$ will not be too great in magnitude upon turning on of the rectifier thus harming the rectifier.

For a fuller understanding of the nature and further objects of the present invention, reference should be had to the following detailed description, taken in connection with the accompanying drawings.

DESCRIPTION OF DRAWINGS

FIG. 1 is a schematic diagram of a stud welding system embodying the present invention.

DESCRIPTION OF INVENTION

Generally, the system illustrated in FIG. 1 includes a stud welding gun 90 and a control circuit 92. Control circuit 92 includes a transformer 94 for supplying alternating current, a capacitor 96 for supplying welding current when charged, a silicon controlled rectifier 98 for charging capacitor 96 and a silicon controlled rectifier 100 by which the welding current through the gun is controlled. The operation of control circuit 92 will be described now in conjunction with a stud 102 and a workpiece 104.

As shown, gun 90 includes a chuck 106 for holding stud 102, the end of which is shown as being provided with a projection 108. Chuck 106 is reciprocable within a housing 110 of gun 90, being biased into its most outward position by a spring 112. The chuck is so designed as to be forced into housing 110 when the gun is manually directed against workpiece 104. When a welding current is passed through stud 102, projection 108 and workpiece 104 as hereinafter described, projection 108 disintegrates in a manner known to the art and stud 102 is directed under the bias of spring 112 into contact with workpiece 104 at a time when the contiguous portions of the stud and the workpiece have been heated to welding temperature by the welding current.

The discharge of the welding current is accomplished as follows. When stud 102 is brought into contact with workpiece 104 and a trigger 144 is manually actuated, a circuit from rectifier 146 through a relay coil 148, through trigger switch 144, through stud 102, through ground and back to the other side of rectifier 146 is completed. When relay coil 148 is so energized normally closed relay contacts 150 open and normally open relay contacts 152 close. Contacts 152, when closed, impress a voltage from the gate to the cathode of silicon controlled rectifier 100, which voltage is limited to a safe value by resistor 154. A diode 155 prevents a negative voltage from being applied to the gate of silicon controlled rectifier 100. The gate to cathode voltage causes silicon controlled rectifier 100 to conduct and to discharge welding capacitor 96 through stud 102, thereby effecting the weld.

Capacitor 156 acts as a time delay on relay coil 148 when trigger 144 is opened or when the gun is removed from stud 102 and will permit silicon controlled rectifier 100 sufficient time to recover its blocking condition before normally closed relay contacts 150 close.

It has been found that the extremely high current discharge rates through the silicon controlled rectifier, especially those occurring when the power supply is a capacitor, will damage the rectifier if $dV/dt$ is permitted to be too great upon turning on of the rectifier. The present invention controls $dV/dt$ by employing a bleed resistor 157 across the cathode of the silicon controlled rectifier 100 and the negative terminal of the power supply, i.e., capacitor 96 in the embodiment of FIG. 1. Bleed resistor 157 permits a small leakage current to pass from the anode to the cathode of the silicon controlled rectifier junctions to a degree at which $dV/dt$ is maintained at an acceptable maximum during turning on.

In one embodiment of the invention, capacitor 96 was 40,000—60,000 microfarads and was charged approximately to 175 volts. Bleed resistor 157 was approximately 40,000 ohms and produced approximately a one-half volt drop across the resistor when the silicon controlled rectifier is turned off.

While the use of bleed resistor 157 has been described in conjunction with a capacitive welding power supply and with a welding gun which operates in the contact mode, it is anticipated that this aspect of the invention will also find use with other forms of power supplies and in other modes of welding gun operation.

Recharging of capacitor 96 is accomplished by means of silicon controlled rectifier 98 which applies direct current to the capacitor 96 in response to alternating current from transformer 94. Alternating current power is applied to the primary 120 of isolation transformer 94 through a suitable on-off switch and fuse (not shown). In consequence, an alternating voltage is developed between secondary transformer terminals 122 and 124. When terminal 124 is positive with respect to terminal 122, current flows (in the direction of electron flow) from terminal 124 to capacitor 96 and from capacitor 96 through a resistor 126 to the cathode of silicon controlled rectifier 98, through a diode 128 and gate resistor 130, through a selected portion of a potentiometer 132, between points 134 and 136, through a diode 138 and back to terminal 122. Also, when terminal 124 is negative with respect to terminal 122, current flows through potentiometer 132 and through diode 138, causing a voltage drop from a point 140 to point 134. Point 134, which is the selector of potentiometer 132, can be moved to select any voltage between zero and the maximum developed across potentiometer 132. This maximum is equal to the voltage between terminal 140 and terminal 136.

When the voltage across capacitor 96 rises to approximately equal the voltage drop between point 134 and point 140, the voltage between gate 116 and the cathode of silicon controlled rectifier 98 will be less than the minimum firing voltage of silicon controlled rectifier 98. Thus, as the polarity between terminals 122 and 124 reverses every half cycle of the alternating current input, the current from cathode to anode drops to zero at this time. The current, therefore, is below the holding current so that silicon controlled rectifier 98 is switched to the nonconducting state. It remains in this state until gate current is caused to flow again as a result of actuation of contacting silicon controlled rectifier 100 in the manner earlier described.

As additional feature, which is optional, is a relay coil 158, which, being in parallel with charging resistor 126 will operate when charging current flows through resistor 126. When relay 158 energizes, it will open normally closed contacts 161 rendering the discharge circuit inoperative while the capacitor 160 serves to ensure that relay 158 remains energized until the welding capacitor 96 is fully charged.

The present invention thus provides a light weight and efficacious switch, whereby heavy welding currents can be controlled in the absence of moving mechanical parts that are subject to wear and maladjustment. Since certain changes may be made in the above apparatus without departing from the scope of the invention herein involved, it is intended that all matter contained in the above description or shown in the accompanying drawing shall be interpreted in an illustrative and not in a limiting sense.

We claim:

1. In stud welding apparatus including a welding gun having means for holding a stud to be welded to a workpiece, a power supply for providing the welding energy and contactor means for selectively connecting the power supply in circuit with the stud and workpiece to effect the weld, the improvement in said contacting means comprising:

A gating rectifier having its anode and cathode connected in series with said power supply and said stud and workpiece to provide the control for the discharge of the welding energy;

Circuit means for selectively placing a potential across the gate to cathode junction of the gating rectifier to establish a current of magnitude sufficient to turn on said rectifier to discharge the power supply across the stud and workpiece to effect the weld; and Impedance means in series with the rectifier and the power supply of value sufficient to maintain the current level through the rectifier below the holding value thereof but which permits sufficient leakage current therethrough when the gating rectifier is turned off to maintain $dV/dt$ within acceptable limits upon turning on of said rectifier.

2. The welding apparatus of claim 1 in which said power supply is a capacitive power supply and said impedance means is a resistor.

3. The welding apparatus of claim 2 in which said circuit means includes means under control of the operator for connecting the welding power supply across the gate to cathode junction of said rectifier to effect turning on of said rectifier.

4. Stud welding apparatus including a welding gun having means for holding a stud to be welded to a workpiece comprising:

a power supply of high energy and low internal impedance;

welding conductor means of negligible impedance directly connecting said power supply across the stud and workpiece;

a gating rectifier having its anode and cathode connected in circuit with said welding conductor means to provide the control for the discharge of the welding energy;

circuit means for selectedly placing a potential across the gate to cathode junction of the gating rectifier to establish a current magnitude sufficient to turn on the rectifier to discharge the power supply across the stud and workpiece to effect the weld; and impedance means in series with the rectifier and the power supply of value sufficient to maintain a current level through the rectifier below the holding value thereof but which permits sufficient leakage current therethrough when the gating rectifier is turned off to drop the major portion of the power supply voltage across the rectifier when in its off state to substantially eliminate $dV/dt$ upon contact of the stud with the workpiece to prevent premature turning on of the rectifier with its consequential hazardous effects and poor weld results.

5. The stud welding apparatus of claim 4 wherein said impedance means is in parallel with the stud and workpiece and is shunted thereby upon contact of the stud with the workpiece.